United States Patent Office 2,757,078
Patented July 31, 1956

2,757,078

METHOD OF PRODUCING METAL POWDER

John Olof Edström, Enskede, Stockholm, Sweden

No Drawing. Application August 14, 1953,
Serial No. 374,437

12 Claims. (Cl. 75—.5)

The present invention relates to a process for producing directly a useful metal powder of pulverulent compounds, and it relates particularly to a process for directly producing iron powder from iron oxides, such as concentrate, scale or the like.

Several methods have been proposed for producing metal powder, which methods are based upon the reduction of pulverulent oxides, while the pulverulence is maintained. However, when higher reduction temperatures are used, these methods have failed, due to the fact, that the grains sinter during the reduction.

It has been proved, however, that it is possible to directly reduce metal oxide powder to the metal at high temperatures, the pulverulence being maintained, without the metal grains sintering.

The method according to this invention briefly consists therein that a dispersion medium consisting of a material containing one or more compounds of the alkaline earth metals or magnesium, which material is wholly or partly in oxidized form or can wholly or partly be converted into oxidized form, is mixed with the pulverulent compound of the metal to be produced, water being added, and is thereafter formed into mouldings, which are dried and subjected to the action of a reducing agent in a furnace, whereafter the reduced metal is exposed by converting the oxide or oxides of the dispersion medium into hydroxide form.

When the metal powder is produced, 80–30 parts, preferably 70–50 parts of a pulverulent metal oxide, for example ore concentrate, scale or the like, are mixed with 20–70 parts, preferably 30–50 parts of the dispersion medium consisting of a material which contains compounds of one or more of the alkaline earth metals or magnesium, which, if not in the oxide form, through calcination is converted into oxide, 5–12 parts of the dispersion medium preferably being hydroxide or hydroxides. Ca-compounds, particularly $CaCO_3$, and Mg-compounds and mixtures of these, for example dolomite, are particularly well suited. Either water is added during the mixing up to a percentage of moisture of 6–20%, preferably 8–10%, or the water is added in connection with the forming of the mouldings. The mixture is converted into mouldings, for example by rolling it to pellets in a drum or by pressing it to briquettes or in any other suitable manner, after which the mixture is dried and placed in a furnace, where it is subjected to the action of a reducing agent. Of course the drying may also be carried out in the furnace. The dispersion medium is converted into oxide form either before, during or after the reduction. Finally the reduced metal is exposed by immersing the mouldings in water or by spraying them with water vapour immediately after the reduction, whereby the oxides formed are converted into hydroxide form. Then the metal powder can be separated, which, for example in the case of iron powder, can be carried out by means of magnet-separation.

The amount of dispersion medium used depends to a large extent on the particle size of the dispersion medium and the metal oxide and on the reduction temperature, but it is always much larger than that amount which is added to usual sinter pellets as a binder. Only in the case of concentrates of extremely coarse grains amounts of 20% of the weight of the mixture have been sufficient. A minor part of hydroxide, preferably 5–12% by weight of the charge, may be included in the dispersion medium, but this may also consist of one or more hydroxides as well as of one or more carbonates or one or more oxides. The dispersion medium may also consist of mixtures of hydroxides, carbonates and oxides in all proportions. When the dispersion medium consists of a material containing calcium, it has proved suitable to use a mixture of calcium carbonate and calcium hydroxide approximately in the proportions 5:1–4:1, whereby the hydroxide during the drying and preheating of the mouldings forms carbonate and thus gives the mouldings an extraordinary high compression strength amounting to 200–400 kilogrammes/pellet ($\phi=20$ millimeters). It is not necessary to add an extra binder.

The grain size and the grain distribution of the metal oxide are chosen to the purpose for which the finished powder is to be used, and the average grain size of the metal oxide is chosen 10–50% smaller than the desired average grain size of the finished metal powder.

The reducing agent may be gaseous, liquid, or solid. Suitable gaseous reducing agents are carbon monoxide, hydrogen gas, gases containing hydrogen and mixtures of these gases in all proportions. Suitable liquid reducing agents are for instance tar and mineral oil products, and suitable solid reducing agents are for example pulverulent coke, pit-coal, charcoal, sawdust, and peat. The liquid and solid reducing agents are mixed with the metal oxide powder and the dispersion medium, or may in order to be better utilized, be introduced solely into the cores of the mouldings, a coating of dispersion agent and metal oxide thereafter being applied on said cores.

The temperature of reduction is maintained between 450° and 1200° C., preferably 600°–1100° C., when reducing with hydrogen gas, and when reducing with carbon monoxide and with mixture of hydrogen gas and carbon monoxide the temperature is maintained between 850° and 1200° C., preferably 850°–1100°, which is also the temperature of reduction when solid reducing agents are used. Any type of furnace may be used for the reduction, but common iron sponge furnaces are preferred, particularly such furnaces in which the reducing agent can be utilized to the utmost. The conversion of the dispersion medium into oxide form and the reduction of the metal oxide powder can be carried out simultaneously at a temperature exceeding the temperature of decomposition or calcination of the hydroxides and/or carbonates contained in the dispersion medium. However, these processes are preferably carried out separately, and it is particularly to be preferred to converse the dispersion medium into oxide form before the reduction, whereby the contents of $CO_2$ and/or $H_2O$ in the zone of reduction may be kept low, and whereby the ore concentrate is simultaneously roasted, so that the reduction runs more rapidly. For heating to calcination temperature gas taken from the zone of reduction is used, which has already been utilized for reduction as completely as possible and it is particularly advantageous to use an iron sponge furnace of Wiberg-Söderfors type in carrying out the method this way. If the material thereafter is allowed to cool in the furnace, it must be seen to it that the oxides of the dispersion medium are not brought into contact with $CO_2$-containing gas of a too low temperature, such carbonate being then reformed, which cannot be converted into hydroxide form.

The time which it takes to reduce the mouldings is about 50% shorter than the time for reducing sinter pellets of corresponding grain size.

Comprehensive practical tests have shown that the strength of the mouldings during the calcination and the reduction is excellent; it is about four times greater than what is necessary for material to be charged into iron sponge furnaces of Wiberg-Söderfors type. When the dispersion medium is converted into hydroxide form, however, the reduced mouldings are completely decomposed. The mouldings should preferably be taken out of the furnace at red heat, that is 600°–700° C., and be immersed directly into water, whereby they rapidly decompose. The oxidation of the powder when immersing the mouldings into water, is prevented through the alkaline aqueous solution formed.

The coarse separation of dispersion medium and metal powder may take place either mechanically or magnetically in wet or dry condition and in one or more steps. The rest of dispersion medium adhering to the metal grains may be completely washed off with water or diluted acids, e. g. hydrochloric acid, phosphoric acid or sulphuric acid. When washing the metal powder with acids, the powder thereupon is treated with an anti-corrosive, e. g. sodium nitrite or a diluted triethanolamine solution. The subsequent drying of the metal powder should be made very quickly.

The oxide of the dispersion medium may also be converted into hydroxide by treating the reduced and, if the dispersion medium originally was not in the oxide form, calcined mouldings with water vapour. This is particularly suitable where a small content of dispersion medium is used as the mouldings more easily decompose when a small content of dispersion medium is used as the mouldings more easily decompose when treated with water vapour.

Part of the dispersion medium hydroxide is returned to the process as a binder for the mouldings. The water required in forming the mouldings may be added in form of water used for washing and/or water used for converting oxide into hydroxide.

The invention is further illustrated by the following examples in which by parts there are understood parts by weight and in which the value of the green density has been determined on a test body pressed from the produced powder to a cylinder with 1" diameter at a pressure of 4.3 tons/square centimeters.

*Example 1*

40 parts of limestone, 10 parts of slaked, slimed lime and 50 parts of iron concentrate containing about 71.5% of Fe and having such a particle size that 25% will pass through a 200 mesh Tyler screen, were mixed while adding 9 parts of water, and rolled to pellets in a drum. The particle size of the limestone was essentially the same as that of the concentrate. The pellets were dried in air at room temperature, obtaining a compression strength of about 250 kilogrammes/pellet ($\phi=20$ millimeters). The dried pellets were introduced into a tube furnace where they were first calcined and then reduced with a gas consisting of 70% of CO and 30% of $H_2$ for five hours. The velocity of the gas was about 10 centimeters/second. The temperature of the furnace varied between 900° and 1000° C. Immediately after the end of the reduction the pellets were immersed in water and within half an hour they completely decomposed. The iron powder formed was magnetically separated from the lime, washed with water and rapidly dried at a temperature of 120° C. The powder had the following properties:

Fe, per cent _____ Appr. 98
$H_2$-loss per cent (according to MPA * standard) 1.6
O, per cent _____ 0.72
Insoluble in concentrated HCl, per cent _____ 0.5
CaO, per cent _____ 0.2
Green density g./cm.³ _____ 6.11

* Standard adopted by Metal Powder Association of New York.

*Example 2*

The pellets according to Example 1 were reduced with a gas consisting of 30% CO and 70% of $H_2$. The time of reduction was four hours. In other respects the procedure was the same as in Example 1. The calcined and reduced pellets just as easily decomposed and iron powder having the following properties was obtained:

Fe, per cent _____ Appr. 97
$H_2$-loss per cent (according to MPA standard) _____ 1.4
O, per cent _____ 0.5
Insoluble in concentrated HCl, per cent _____ 0.4
CaO, per cent _____ 0.2
Green density g./cm.³ _____ 6.2

*Example 3*

50 parts of slaked slimed lime and 50 parts of the same concentrate as in Example 1 were mixed and rolled to pellets while adding 9 parts of water, treating the mixture in accordance with Example 1. The pellets just as easily decomposed and the obtained powder had the following properties:

Fe, per cent _____ Appr. 98
$H_2$-loss per cent (MPA standard) _____ 1.7
O, per cent _____ 0.7
Insoluble in conc. HCl, per cent _____ 0.5
CaO, per cent _____ 0.2
Green density g./cm.³ _____ 6.1

*Example 4*

40 parts of limestone, 10 parts of slaked lime and 50 parts of nickel oxide powder minus 150 Tyler mesh were mixed while adding 9 parts of water and rolled to pellets, which were then treated in accordance with Example 1. Yet, the time of reduction was extended to 10 hours. The calcined and reduced pellets easily decomposed and the nickel powder obtained had the following properties:

|  | Per cent |
|---|---|
| Ni | 97.8 |
| $H_2$-loss | 1.2 |
| O | 0.4 |
| Insoluble in concentrated HCl | 0.5 |
| $SiO_2$ | 0.2 |
| CaO | 0.2 |

*Example 5*

A mixture of 40 parts of limestone, 10 parts of slaked lime and 50 parts of cobalt oxide minus 150 Tyler mesh with an addition of 9 parts of water was rolled to pellets and then treated in accordance with Example 4. The pellets easily decomposed when immersed in water and the cobalt powder obtained had the following composition:

|  | Per cent |
|---|---|
| Co | 88.2 |
| Fe | 1.8 |
| O | 1.1 |
| $SiO_2$ | 1.4 |
| CaO | 0.3 |

With the process according to our invention it is possible to produce, in a quick and reliable manner, a metal powder having the desired particle size and distribution and of a very good quality. Furthermore, fine-porous as well as coarse-porous metal powder can be produced according to the present invention, a high CO-content of the reduction gas and a high temperature giving a coarse-porous powder while a high $H_2$-content and a low temperature give a fine-porous powder.

A coarse-porous metal powder will also be obtained by employing a concentrate having a high $Fe_2O_3$-content. In comparison with the known methods our process has also the great advantage of being essentially cheaper and comprising a less number of production steps. In the present process a minimum of fuel and reducing agent is required and the powder produced is extraordinarily porous and easy to mould by means of pressing. When using a dispersion medium substantially consisting of CaCO₃ still another advantage is attained consisting in this carbonate being conversed into the hydroxide, which is a valuable by-product. A further advantage in comparison with the known methods is that the great quantity of dispersion medium which contains desulphurizing substances, makes it possible to use also sulphuric fuels without in any way deteriorating the quality of the metal powder obtained.

Having now described my invention, what I claim as new and desired to secure by Letters Patent is:

1. In the production of metal powder a method comprising the consecutive steps of mixing a dispersion medium containing at least one compound of a metal selected from the group consisting of the alkaline earth metals and magnesium with a compound of the metal to be produced together with water, forming the mass obtained into mouldings, drying said mouldings, exposing the mouldings to the action of a reducing agent in a furnace and finally converting the dispersion medium into a hydroxide to decompose the mouldings in order to expose the metal particles.

2. A method according to claim 1 characterized in that the reduction temperature is maintained between 450° and 1200° C.

3. A method according to claim 1 characterized in that the dispersion medium is an oxide.

4. A method according to claim 1 characterized in that the metal oxide of the mouldings is reduced with a solid reducing agent surrounding the mouldings.

5. A method according to claim 1 characterized in that the reducing agent is introduced into the core of the moulding, the core being coated with a layer consisting of metal oxide and the dispersion medium.

6. A method according to claim 1 characterized in that the dispersion medium oxide in the reduced mouldings is transformed into hydroxide by treatment with water.

7. A method according to claim 1 characterized in that the metal powder is separated from the dispersion medium.

8. A method according to claim 1 characterized in that the rest of the dispersion medium is removed from the metal powder through washing with a liquid selected from the group consisting of water and diluted acids.

9. A method according to claim 1 characterized in that the metal powder is subjected to a treatment with anti-corrosives.

10. A method according to claim 1 characterized in that the reduction temperature is maintained between 600° C. and 1100° C.

11. A method according to claim 1 characterized in that the dispersion medium is a compound selected from the group consisting of carbonides and hydroxides and is calcined prior to the step of converting the same to a hydroxide.

12. A method according to claim 1 characterized in that the average particle size of the metal oxide is 10% to 50% smaller than the desired average particle size of the finished metal powder.

References Cited in the file of this patent

UNITED STATES PATENTS

| | | |
|---|---|---|
| 1,602,542 | Marden | Ot. 12, 1926 |
| 2,028,105 | Head | Jan. 14, 1936 |
| 2,377,676 | Coxe | June 5, 1945 |
| 2,386,072 | Stewart | Oct. 2, 1945 |
| 2,587,113 | Cavanagh | Feb. 26, 1952 |

FOREIGN PATENTS

| | | |
|---|---|---|
| 617,975 | Great Britain | Feb. 15, 1949 |